United States Patent
Chapman et al.

(10) Patent No.: US 8,615,497 B1
(45) Date of Patent: Dec. 24, 2013

(54) ASSURED FEDERATED RECORDS MANAGEMENT

(75) Inventors: Andrew Chapman, Hopewell, NJ (US); David Martin, Toronto (CA)

(73) Assignee: EMC Corporation, Hopkinton, MA (US)

( * ) Notice: Subject to any disclaimer, the term of this patent is extended or adjusted under 35 U.S.C. 154(b) by 823 days.

(21) Appl. No.: 12/005,125

(22) Filed: Dec. 19, 2007

Related U.S. Application Data

(60) Provisional application No. 60/965,018, filed on Aug. 15, 2007.

(51) Int. Cl.
*G06F 15/16* (2006.01)
*G06F 17/20* (2006.01)

(52) U.S. Cl.
USPC .......................................... 707/687; 707/690

(58) Field of Classification Search
USPC .......................... 707/648, 971, 966, 687, 690
See application file for complete search history.

(56) References Cited

U.S. PATENT DOCUMENTS

| | | | |
|---|---|---|---|
| 6,654,746 B1* | 11/2003 | Wong et al. | 1/1 |
| 2003/0055809 A1* | 3/2003 | Bhat | 707/1 |
| 2003/0225774 A1* | 12/2003 | Davidov et al. | 707/100 |
| 2004/0229200 A1* | 11/2004 | McKeon et al. | 434/350 |
| 2006/0206905 A1* | 9/2006 | Werner | 719/330 |
| 2006/0230044 A1* | 10/2006 | Utiger | 707/10 |
| 2006/0282477 A1* | 12/2006 | Gruidl et al. | 707/201 |

* cited by examiner

*Primary Examiner* — Alex Gofman
(74) *Attorney, Agent, or Firm* — Van Pelt, Yi & James LLP

(57) ABSTRACT

A record is managed by obtaining from an external system on which a stored object comprising the record is stored a property of the stored object as stored on the external system. A stored property associated with the record is compared with the obtained property of the stored object. In the event the comparison does not match, responsive action is taken.

23 Claims, 12 Drawing Sheets

ASSURED FEDERATED RECORDS MANAGEMENT

CROSS REFERENCE TO OTHER APPLICATIONS

This application claims priority to U.S. Provisional Patent Application No. 60/965,018 entitled ASSURED FEDERATED RECORDS MANAGEMENT filed Aug. 15, 2007 which is incorporated herein by reference for all purposes.

BACKGROUND OF THE INVENTION

A company is sometimes required to apply compliance controls to emails, financial information, product information, or other company assets, for example as part of a lawsuit. These assets are often stored and managed on different types of systems that operate independently. For example, financial information and emails may be stored on different systems and managed by different software applications or processes. One approach is to apply controls to each system individually. For example, each system implements its own set of compliance functions that manages the data stored on that particular system. However, this approach lacks scalability and/or centralization which in some cases it an unattractive solution. For example, every time a new system is deployed that requires compliance controls, new compliance functionality needs to be implemented on that system which may be expensive.

Alternatively, in a federated records management system, a single system enforces compliance controls across some or all systems of an entire enterprise. For example, a proxy object is created on a records management master system. The proxy object points to or references a piece of content or other data stored on an external or remote system. There may be a requirement that such a piece of content or other data, sometimes referred to herein as a "stored object" or "stored content item", be retained and that it not be changed. For example, the stored object may be an email that needs to remain untouched for discovery during litigation. In some cases, a piece of content or data being protected is under the management or control of another (e.g., legacy) system or process for protecting or backing up data. This may, for example, allow a user to use a federated records management system without having to migrate information or systems. However, it may be difficult or impossible to prevent local systems or processes on an external system from changing or deleting the content or other information being protected on that system.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
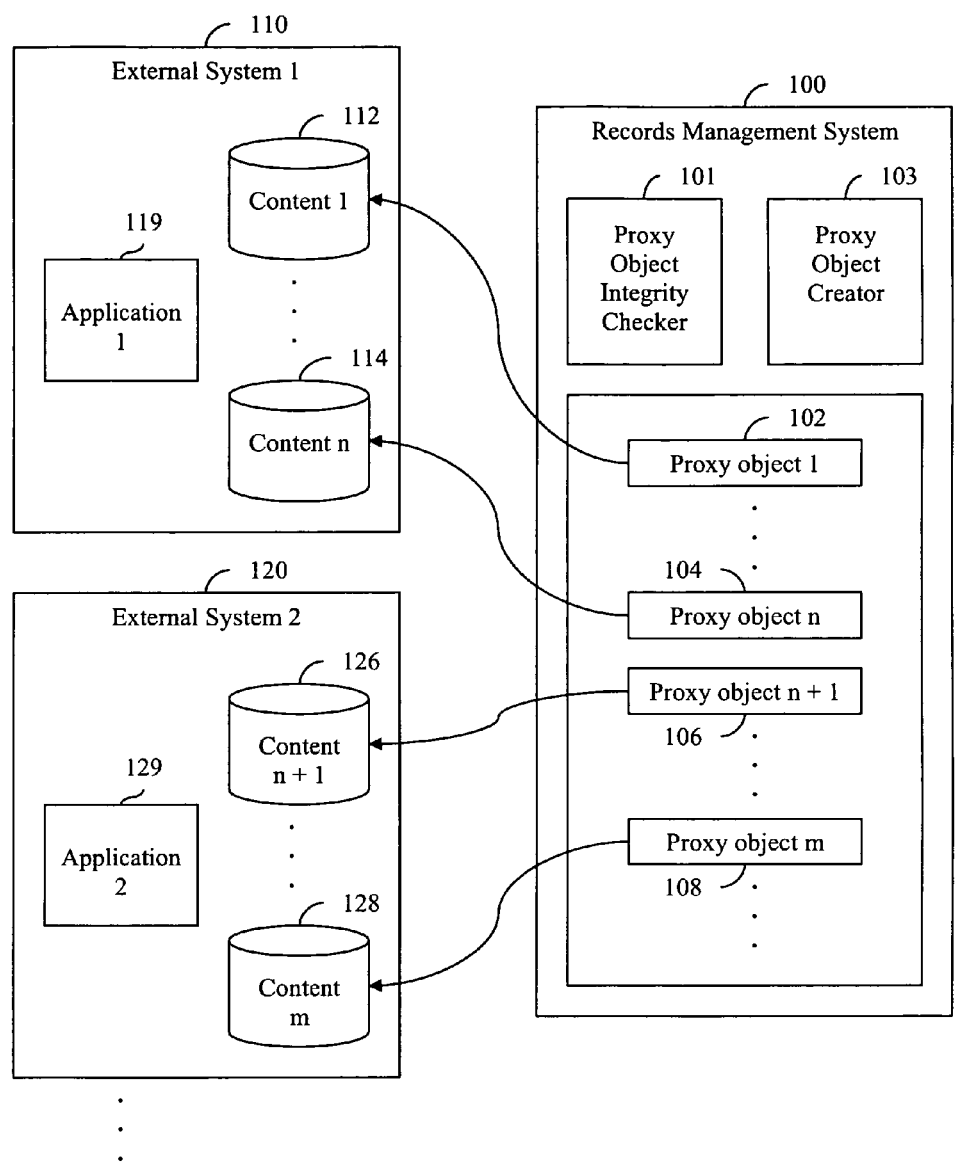
FIG. 1 is a diagram illustrating an embodiment of a federated records management system.

FIG. 1 is a diagram illustrating an embodiment of a federated records management system. In the example shown, proxy objects 1 (102), n (104), n+1 (106), and m (108) are stored on records management system 100. A proxy object is one example of a structure or entity configured to control an externally and/or remotely stored content item. Other structures or entities may be used in other embodiments. A proxy object points to or is associated with a corresponding stored object on an external system. In the example, stored objects are shown as "content". Examples of stored objects include files, settings, metadata, database data, emails, etc. In this particular example, proxy objects 1 (102) and n (104) are associated with content 1 (112) and n (114) on external system 1 (110) and proxy objects n+1 (106) and m (108) are associated with content n+1 (126) and m (128) on external system 2 (120). A stored object may become a "record" required to be retained, unchanged, and/or subject to further and/or different controls. In the example shown in FIG. 1, proxy objects are used to manage corresponding stored objects as records. In some embodiments, a record is managed and/or controlled differently than by using proxy objects.

Proxy object creator 103 creates proxy objects in records management system 100. An embodiment of the processing performed by proxy object creator 103 is described in further detail below. Content 1 (112), n (114), n+1 (126), and m (128) must be protected according to some compliance control or records management controls. In some embodiments, stored objects are protected according to different controls. For example, content 1 (112) and n (114) associated with application 1 (119) may have different controls than content n+1 (126) and m (128) associated with application 2 (129). Some example of controls or protection of stored objects include: not deleting a stored object unless appropriate approval is obtained, not changing the parameters or properties of the stored object, not moving the stored object from its current location, etc.

Typically, it is difficult in a federated records management system to make content or other stored objects immutable (i.e., prevent an application or process on an external system from deleting or modifying a stored object). For example, it may be difficult to prevent application 1 (119) from deleting content 1 (112). In some cases, application 1 (119) may not have been designed to have another process or agent control whether it can delete such information, and even if it allowed an external process to control it the application 1 (119) may not be configured to reliably be instructed not to allow itself to delete, change, move, or otherwise modify content 1 (112). Such deletions or changes are undesirable and can have serious consequences. For example, if content 1 (112) is an email that must be protected because of a lawsuit, the court may fine and/or otherwise penalize the company for failing to have preserved the email.

Techniques for verifying that an externally and/or remotely stored content item that has been placed under management as a record remains intact are disclosed. In some embodiments, a record is considered to remain intact if has not been deleted, modified, and/or otherwise disturbed and/or the record remains subject to one or more controls associated with it by virtue of its status as a record. In some embodiments, such as the example shown in FIG. 1, an externally and/or remotely stored object that is to be preserved as a record is represented in a central records management system by a proxy object. Proxy object integrity checker 101 in this example is configured to (e.g., periodically) check proxy objects 1 (102), n (104), n+1 (106), and m (108). The procedure by which this checking is performed may vary depending upon the applicable control or protection. In one example, content 1 (112) is not permitted to be moved or deleted and certain properties of content 1 (112) are not permitted to be changed. In that particular case, proxy object integrity checker 101 uses information stored in proxy object 1 (102) to access content 1 (112) on external system 1 (110). In this example, since content 1 (112) is not permitted to be moved, an exception (also referred to as an error, problem, or an anomaly) occurs if content 1 (112) is not located using the location and/or ID stored in proxy object 1 (102). If it is able to be found, the properties (e.g., a hash) of the content 1 (112) on external system 1 (110) are obtained and compared with the properties stored in proxy object 1 (102).

In some embodiments, exceptions detected by or other processing results of a proxy object integrity checker are written to a log or report. In such embodiments, an administrator or other entity reviews the log or report and takes appropriate action. For example, if an exception is found an administrator may determine which user or process deleted the stored object, begin the process of restoring the deleted object (e.g., from backup tapes), etc. An embodiment of a user interface for searching, manipulating, and/or viewing a log or report is described in further detail below. As described above, in some cases it is extremely difficult or prohibitively expensive to prevent a stored object for which protection is desired from being deleted or changed by a process or user on the external system. In some applications, performing proxy object integrity checking on a periodic basis is attractive because exceptions can be detected and rectified (e.g., by restoring a backup) without the difficulty or cost associated with preventing a violation from occurring in the first place.

In some embodiments, the techniques disclosed herein are used in a system that combines manual controls and automated checking to ensure the manual controls are operating properly. As an example, suppose the system of FIG. 1 is a legacy system that contains a variety of corporate records (e.g., files, databases, emails, etc.). A manual procedure is put into place where users on external systems 1 (110) and 2 (120) are instructed to not delete data on those systems; only permitted administrators are permitted to delete data. To delete stored objects on an external system, a list of stored objects eligible for deletion is obtained and a proper authority (e.g., an administrator for a given external system) deletes those stored objects from the external system. At the next run or iteration of proxy object integrity checker 101, orphaned proxy objects (i.e., a corresponding stored object cannot be found on the external system at the stored location or ID) are determined. An administrator of records management system 100 then deletes the orphaned proxy objects that are found by proxy object integrity checker 101. If the orphaned proxy objects found by proxy object integrity checker 101 exactly matches the list of stored objects to be deleted then the manual controls/measures in place worked properly. If there is a proxy object that should have been orphaned but was not, then an administrator forgot to delete that stored object on an external system. If an extra orphaned proxy object is found, then an administrator deleted a stored object he was not permitted to delete.

In some embodiments, proxy object integrity checker 101 and proxy object creator 103 are created by different entities. That is, proxy object integrity checker 101 is a third party tool or application. In some cases, a company that uses a federated records management system may prefer to have auditing or checking of its records performed by a different company than a company that generated the records.

In various embodiments, processing of information is performed by various devices based on available resources (e.g., processing and/or networking resources) or a desired consumption/preservation of certain resources. For example, in some embodiments a proxy object includes a hash of the corresponding content. Hashing requires processing resources. In some embodiments, content is transferred from an external system to a records management system where the content is hashed so that processing resources on the external system are not consumed.

In some embodiments, the topology or system configuration is different than the example shown in FIG. 1. For example, although this figure shows only one application on a given external system, in some embodiments a remote system includes multiple applications. In some embodiments, there is a single external system. In some embodiments, an external system (e.g., system 110 or 120) is part of the same physical device as a records management master system (e.g., system 100). In some embodiments, one or more networks are used to connect one or more of the example systems shown herein.

Figure 2A:
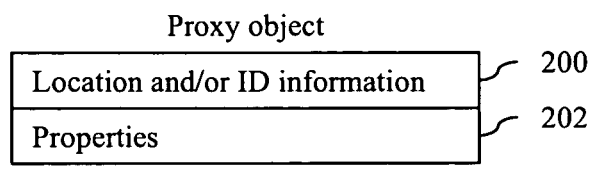
FIG. 2A shows an embodiment of a proxy object.

FIG. 2A shows an embodiment of a proxy object. For example, proxy objects 1 (102), n (104), n+1 (106), and m (108) are configured in some embodiments as shown. Location and/or identifying information 200 includes a location and/or ID of a stored object. In some embodiments, location and/or ID information 200 includes a path, link, or address (e.g., via a network connection) to the particular external system on which a stored object is located. In some embodiments, location and/or ID information 200 includes a path in a file system of an identified system (e.g., /root/dev/product_specs_v1.txt). Properties 202 include properties of the corresponding stored object (e.g., at the time the proxy object was created). In various embodiments, a property is an attribute, metadata, or value based on content/data. Some examples are shown in the next figure.

The particular properties stored in properties 202 may vary depending upon the particular protection or compliance control being applied. In one example of a proxy object, if the compliance control is concerned about the last time a file was edited, that time value is saved in some embodiments in properties 202. Other properties that are not pertinent or do not indicate a violation to the relevant compliance control or protection in place are not necessarily saved. In some embodiments, the minimum or smallest set of information that is sufficient to detect a violation to a particular protection policy is saved in properties 202. For example, it may not be necessary to save the date/time a piece of data was last changed if a hash of the data is saved. For example, in some cases a process or application on an external system controls the reported date/time a piece of data was last changed and the reported date/time might not be accurate or trusted. The format/structure of the proxy objects shown in FIGS. 2A and 2B are merely examples and in other embodiments, the data structure, format, or organization varies from the examples shown herein.

Figure 2B:
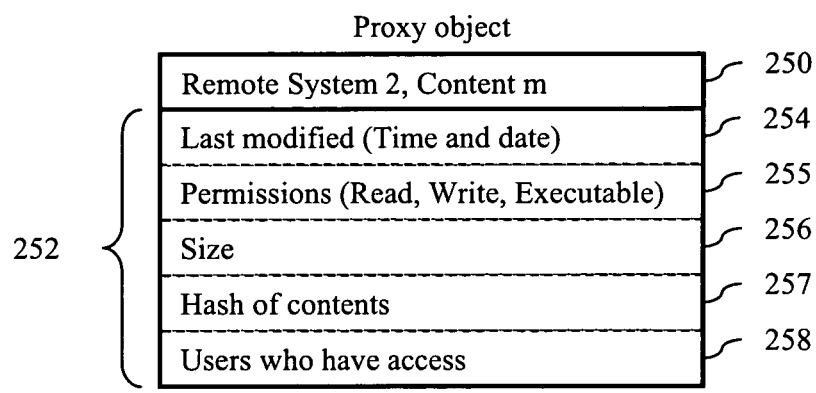
FIG. 2B shows an embodiment of a proxy object with some examples of properties stored in a proxy object.

FIG. 2B shows an embodiment of a proxy object with some examples of properties stored in a proxy object. In the example shown, the proxy object shown is associated with proxy object m (108) of FIG. 1 and location and/or ID information 250 stores "External system 2, content m" (120). Properties 250 include last modified (time and date) 254, permissions (e.g., read, write, executable) 255, size (256), hash of contents 257, and users who have access 258. The values of those properties are stored and used later in a comparison to detect any violations to an applicable protection or compliancy rule. For example, if the size value stored in 256 does not match the size of content m (128) on external system 2 (120) of FIG. 1 when accessed using location and/or ID information 250, an exception is recorded.

Figure 3:
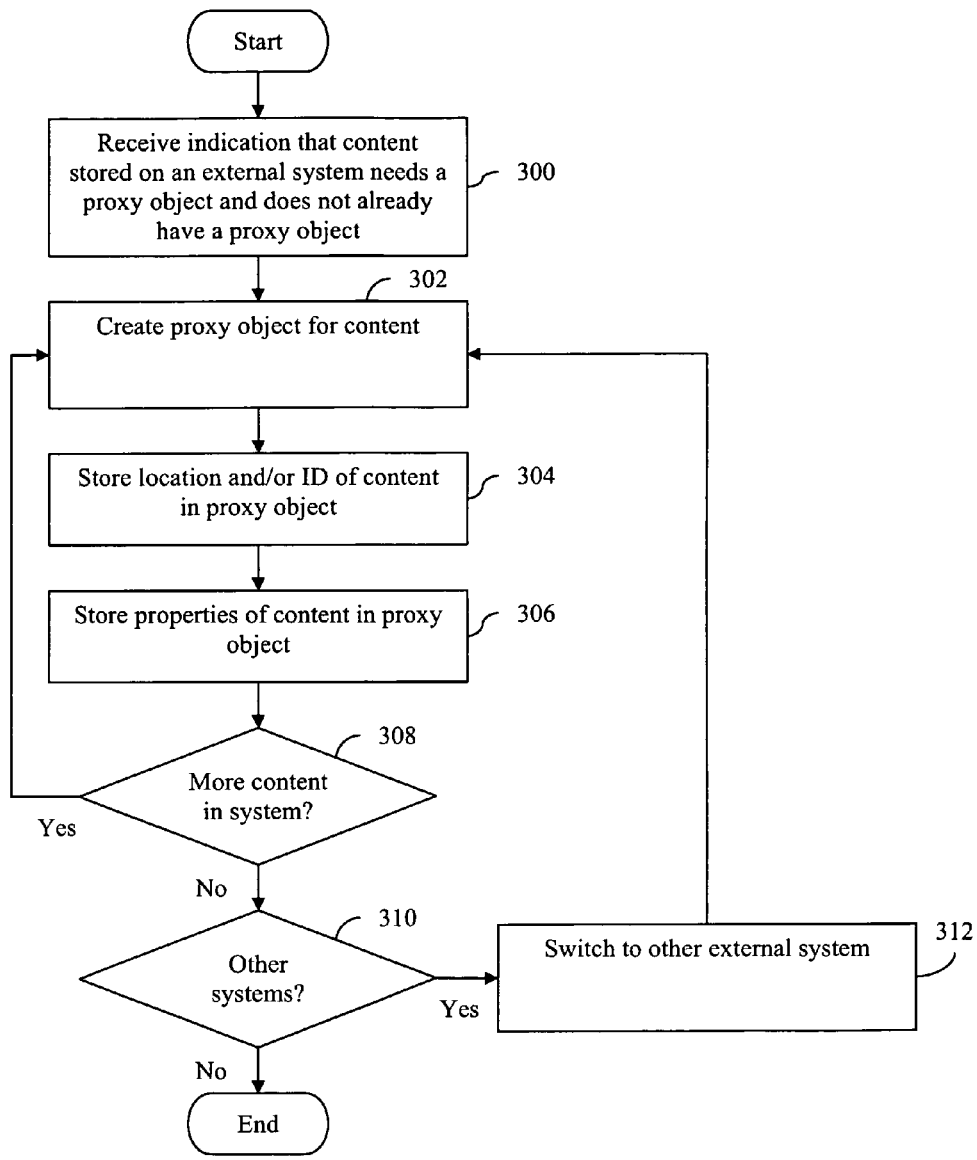
FIG. 3 is a flowchart illustrating an example of a process for creating a proxy object.

FIG. 3 is a flowchart illustrating an example of a process for creating a proxy object. In some embodiments, proxy object creator 103 of FIG. 1 performs the example process. At 300, an indication is received that content stored on an external system needs a proxy object and does not already have a proxy object. In various embodiments, this indication is triggered or initiated by a variety of entities. In some embodiments, there is some user interface via which a user selects stored objects, such as content, to be protected. For those select objects, an indication is generated and transmitted to the appropriate module or process responsible for creating proxy objects (e.g., proxy object creator 103).

At 302, a proxy object is created for the content. In various embodiments, proxy objects are stored in some designated location or are organized in some manner. In some embodiments, proxy objects associated with the same application are stored or kept together. In some embodiments, proxy objects associated with the same compliance control or protection rule are kept together. In some embodiments, proxy objects are stored or organized in manner that makes accessing a desired proxy object faster.

Location and/or ID of the content is stored in the proxy object at 304. In various embodiments, this includes storing a link, address, identifier, path, or other information which identifies the content at that particular point in time. At 306, properties of the content are stored in the proxy object. In some embodiments, this includes obtaining an applicable protection rule or compliance control and determining what properties to store in a proxy object based on the obtained protection rule or compliance control.

At 308, it is determined if there is more content in a system to create proxy objects for. For example, multiple indications may have been received at once and the remaining indications are serviced. If so, a proxy object is created for the next content at 302. Otherwise it is determined if there are other systems to create proxy objects for at 310. For example, proxy object creation for external system 1 (110) is completed and proxy object creation for external system 2 (120) begins. If so, a switch to another external system is performed at 312 and a new proxy object is created at 302.

In some embodiments, some or all of the steps described above are repeated at a later point in time to update or maintain the proxy object as appropriate. For example, an administrator may change a protection rule or compliance policy and as a result, a different set of properties must be stored with the proxy object. In that scenario, storing properties at step 306 may be repeated and the new set of properties is stored in the proxy object. In another example, a proxy object is moved to a new location and/or is assigned a new identifier (in this example, the proxy object is permitted to be moved and/or assigned a new identifier). In that scenario, step 304 is repeated and the new location or ID is stored in the proxy object.

Figure 4:
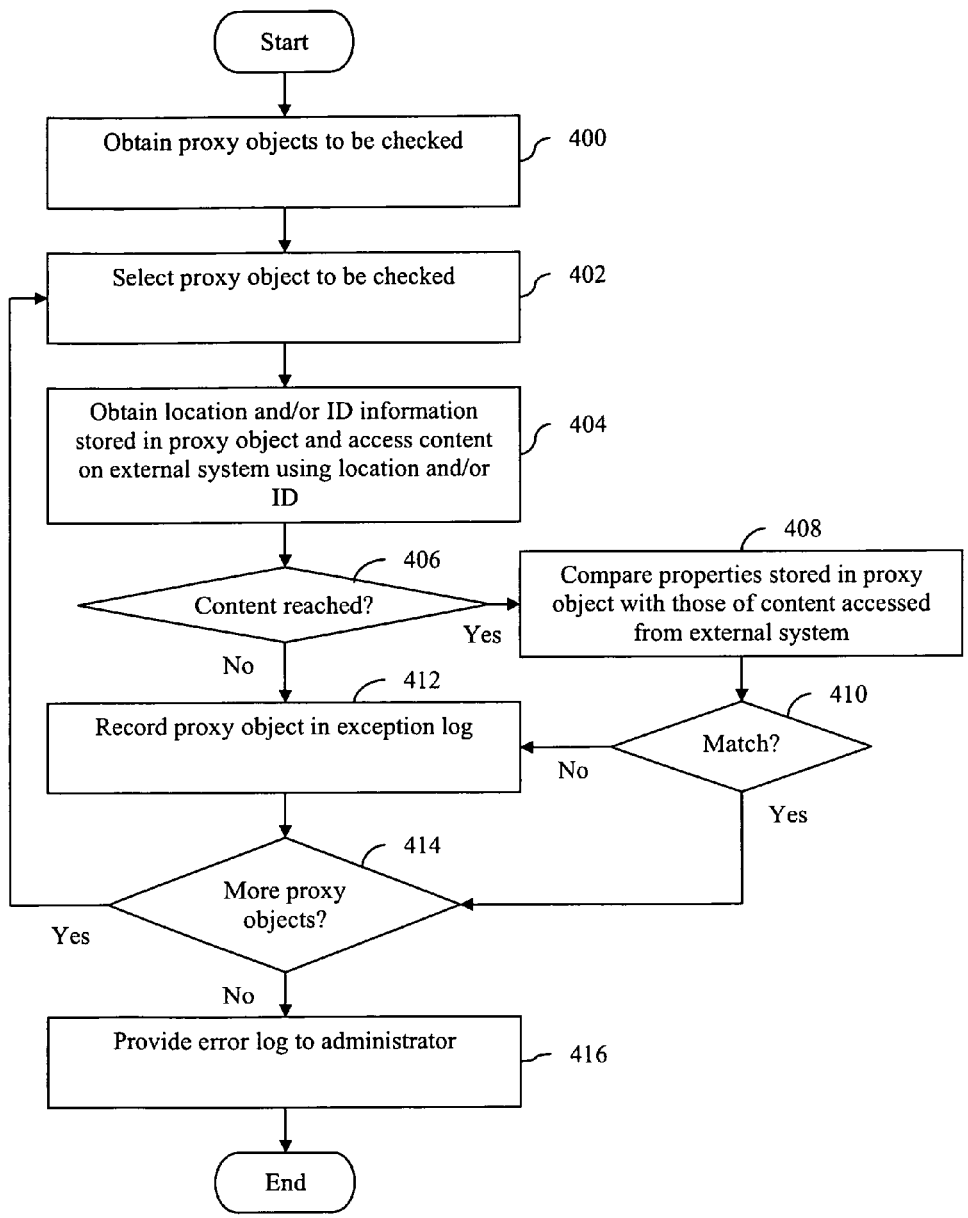
FIG. 4 is a flowchart illustrating an embodiment of a process for checking a proxy object.

FIG. 4 is a flowchart illustrating an embodiment of a process for checking a proxy object. In some embodiments, proxy object integrity checker 101 of FIG. 1 performs the example process shown.

At 400, proxy objects to be checked are obtained. In some embodiments, a subset of all proxy objects is checked. In some embodiments, an administrator or other user specifies which proxy objects to check. In other embodiments, an administrator or other user specifies settings or parameters used by an automated process to select a subset of proxy objects to check. At 402, a proxy object is selected to be checked. For example, a list or set of proxy objects may be obtained at 400 and one proxy object from the list or set is selected at 402. At 404, location and/or ID information stored in a proxy object is obtained and content on an external system is accessed using the location and/or ID. In FIGS. 1 and 2B for example, the location and/or ID stored in 250 is obtained and content m (128) on external system 2 (120) is accessed.

It is determined at 406 if the content is reached. For example, a stored object on an external system may have been moved or deleted after the location and/or ID were stored in the proxy object. If the content is not reached, the proxy object is recorded in an exception log at 412. If the content is reached, properties stored in the proxy object are compared with those of the content accessed from the external system at 408. For example, the size stored in 256 is compared with the size of content m (128) on external system 2 (120) in the examples of FIGS. 1 and 2B. It is determined at 410 if there is a match. If there is no match at 410, the proxy object is recorded in an exception log (also referred to as an audit trail) at 412. In some embodiments, exceptions are recorded in a log so that an administrator who later reviews the exception log is able to determine whether there was an exception because the proxy object was not reached or because at least one property saved in the proxy object did not match the current value of that property. For example, different types of exception may be recorded where some flag or field indicates if the exception is associated with not reaching content (i.e., decision 406) or the exception is associated with a failed match in comparing a property (i.e., decision 410). In some embodiments, those properties that failed a match at 410 are saved in an exception log.

After recording a proxy object in an exception log after step 412 or if there is a match at step 410, it is determined at 414 if there are more proxy objects to be checked. If so, a new proxy object to be checked is selected at 402. Otherwise, the exception log is provided to an administrator at 416. An embodiment of a user interface via which an administrator is able to view, search, and/or manipulate information stored in one or more exception logs is described in further detail below.

In some embodiments, the process of checking proxy objects is performed on a schedule. For example, a system administrator may specify recurring days of the week and/or times at which to perform the example process for checking proxy objects. In such embodiments, exception logs or reports for each iteration or run of a checking process may be saved with the corresponding date and/or time at which the process was run.

Figure 5:
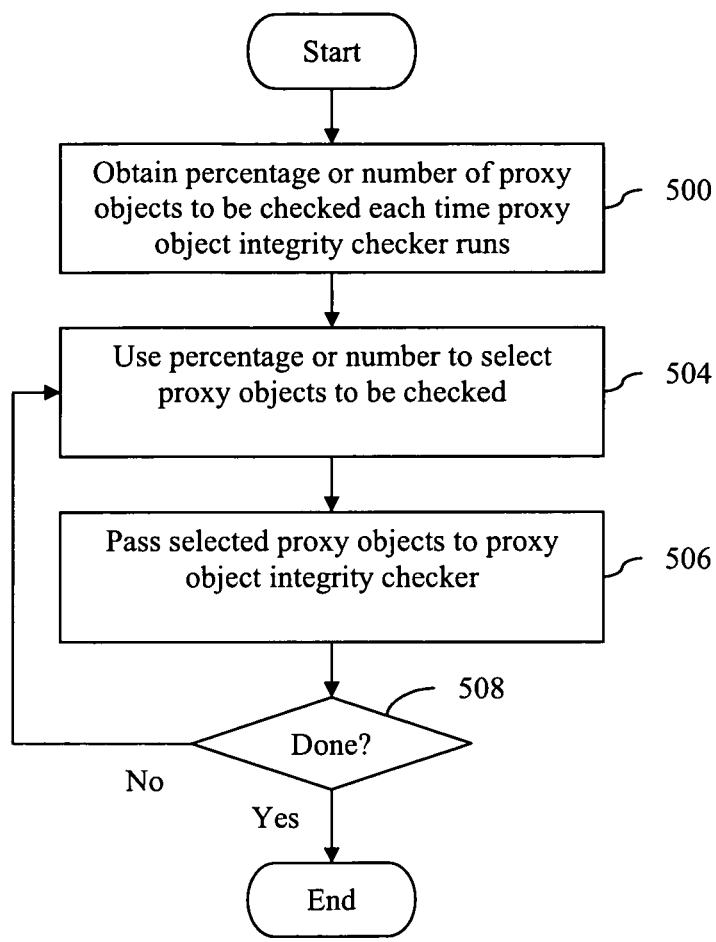
FIG. 5 is a flowchart illustrating an embodiment of a process for selecting a subset of proxy objects to check.

FIG. 5 is a flowchart illustrating an embodiment of a process for selecting a subset of proxy objects to check. In some embodiments, step 400 includes the example process. In some embodiments, the example process is repeated each time a process for checking proxy objects is performed so that a different set of proxy objects is checked each time. In some cases, the number of proxy objects is quite large and it would take too long and/or too many resources to check all proxy objects. In some applications, for example, millions of new proxy objects are added a day to a records management store.

At 500, a percentage or number of proxy objects to be checked each time a proxy object integrity checker runs is obtained. In some embodiments, this is obtained from an administrator. For example, an administer may know the total number of proxy objects, the available bandwidth or system resources for performing checking and/or a confidence goal for meeting a compliance control and this information is used to select an appropriate number or percentage. In some embodiments, there is a default number so that a process is able to automatically select a subset of proxy objects to be checked without requiring user input.

At 504, the percentage or number is used to select proxy objects to be checked. Some embodiments of this are described in further detail below. At 506, the selected proxy objects are passed to a proxy object integrity checker. For example, once received by a proxy object integrity checker the example process of FIG. 4 or some other process is performed. At 508, it is determined if a process is done. If not, at 504 the percentage or number is used to select new proxy objects to be checked. For example, it may be the next iteration or time to perform proxy object checking and the process is repeated.

Figure 6A:
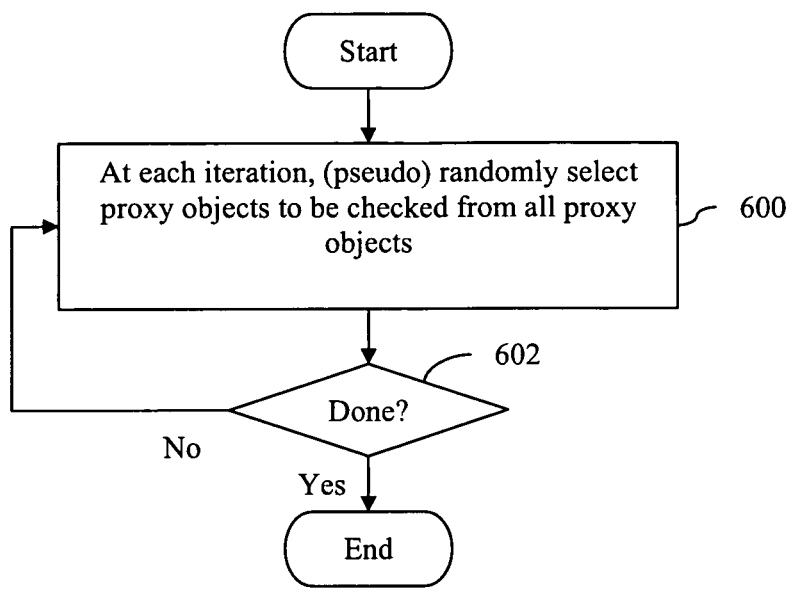
FIG. 6A is a flowchart illustrating an embodiment of a process for randomly selecting proxy objects to be checked without consideration for previous selections.

FIG. 6A is a flowchart illustrating an embodiment of a process for randomly selecting proxy objects to be checked without consideration for previous selections. In some embodiments, step 504 of FIG. 5 uses the example process shown. At each iteration, proxy objects to be checked are (pseudo) randomly selected from all proxy objects at 600. A default or user specified number or percentage of proxy objects to select is used in a selection. The selection at step 600 is made without consideration for which proxy objects were selected during the last or some other previous selection. It is determined at 602 of the process is done. If not, new proxy objects to be checked are (pseudo) randomly selected from all proxy objects at 600.

Figure 6B:
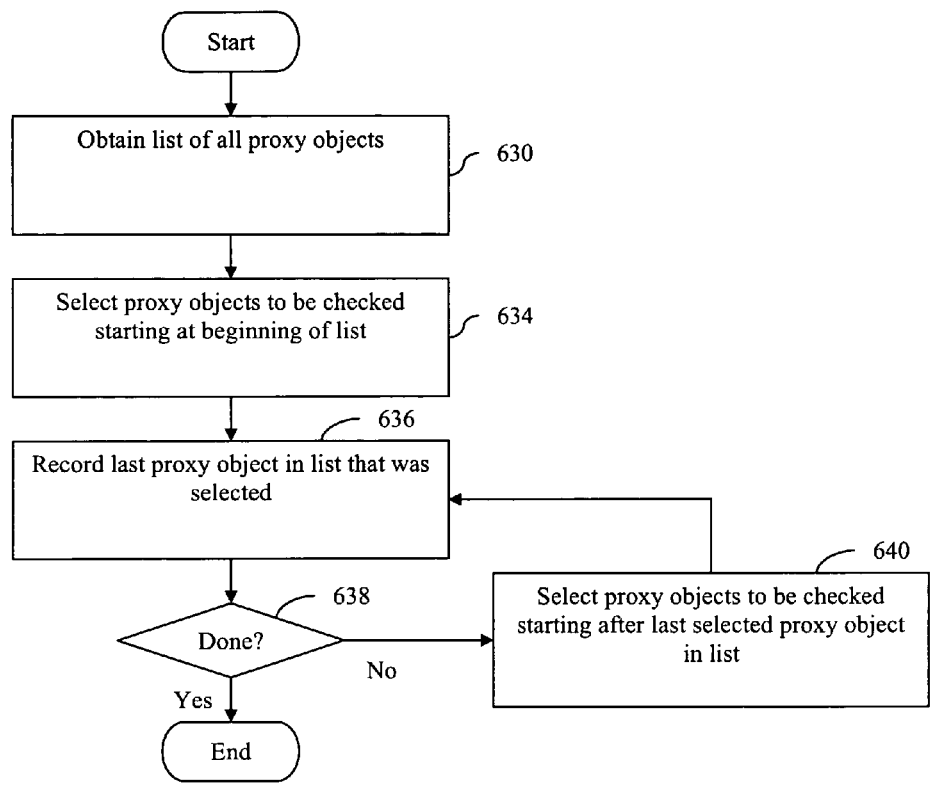
FIG. 6B is a flowchart illustrating an embodiment of a process for selecting proxy objects to be checked according to a list.

FIG. 6B is a flowchart illustrating an embodiment of a process for selecting proxy objects to be checked according to a list. In some embodiments, the example process is used in step 504 of FIG. 5. At 630, a list of all proxy objects is obtained. At 634, proxy objects to be checked are selected starting at the beginning of the list. For example, using a number or percentage of proxy objects to be selected, the first N proxy objects in the list are selected. At 636, a last proxy object in the list that was selected is recorded. At 638, it is determined if the process is done. If not, at 640, proxy objects to be checked are selected starting after the last selected proxy object in the list. For example, if proxy object N in the list was the last proxy object selected from the list, the next set of proxy objects is selected starting from proxy object N+1. In some embodiments, if the bottom of a list is reached and there are still more proxy objects to be selected, the selection process wraps around to the top of the list.

Figure 6C:
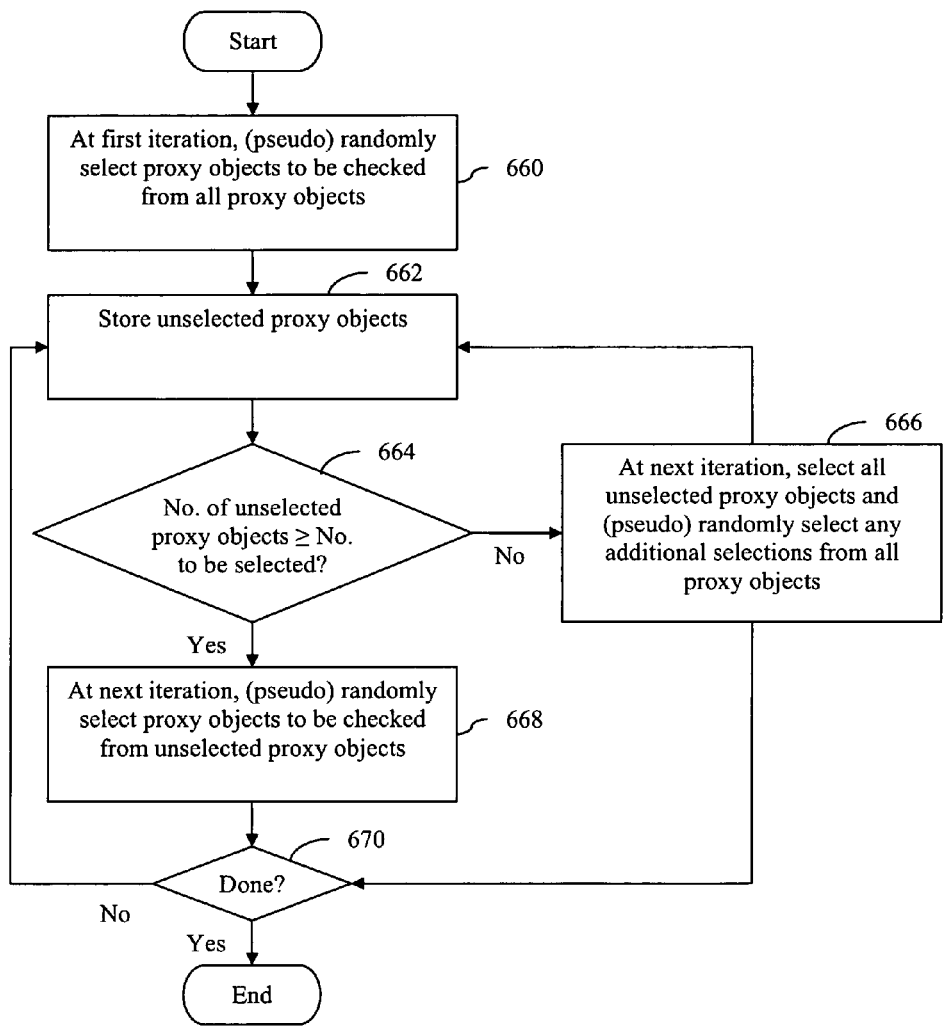
FIG. 6C is a flowchart illustrating an embodiment of a process for randomly selecting proxy objects to be checked from those which have not already been selected.

FIG. 6C is a flowchart illustrating an embodiment of a process for randomly selecting proxy objects to be checked from those which have not already been selected. In some embodiments, selection of proxy objects to be checked in step 504 of FIG. 5 includes the example process. At a first iteration, proxy objects to be checked are (pseudo) randomly selected from all proxy objects at 660. At 662, unselected proxy objects are stored. At 664, it is determined if the number of unselected proxy objects is greater than or equal to the number to be selected. If not (i.e., the number of unselected proxy objects is strictly less than the number to be selected), at a next iteration, all unselected proxy objects are selected and any additional selections are (pseudo) randomly selected from all proxy objects at 666. The remaining unselected proxy objects are stored at 662.

Otherwise, if the number of unselected proxy objects is greater than or equal to the number to be selected, at the next iteration proxy objects to be checked are (pseudo) randomly selected from the unselected proxy object at 668. It is determined at 670 if the process is done. If not, unselected proxy objects are stored at 662.

Figure 7:
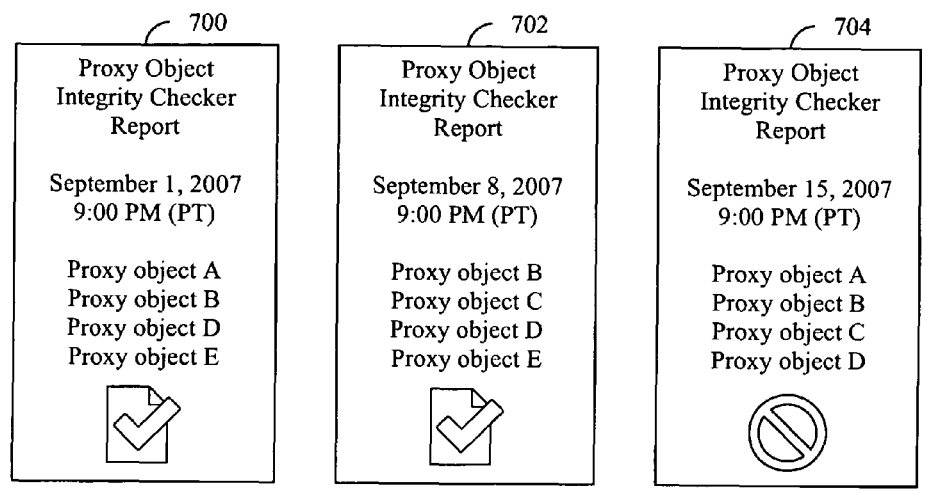
FIG. 7 is a diagram illustrating an embodiment of exception reports.

FIG. 7 is a diagram illustrating an embodiment of exception reports. In the example shown, proxy object exception checking is performed every seven days. Report 700 was generated on Sep. 1, 2007 at 9 PM, report 702 on Sep. 8, 2007 at 9 PM, and report 704 on Sep. 15, 2007 at 9 PM. In the example shown, a subset of proxy objects is checked at each iteration so that there are some proxy objects that are not checked in a given exception report. Proxy objects A, B, D, and E are checked in report 700, proxy object B-E are checked in report 702, and proxy object A-D are checked in report 704. Reports 700 and 702 indicate no exceptions, but report 704 indicates an exception. Some examples of the information included in an exception log include the exception condition information that caused the problem (e.g., the file size had changed).

In various embodiments, a record or log includes various pieces of information. In some embodiments, the records that are checked in a particular iteration are recorded in an associated log or report. For example, report 700 includes information indicating that proxy objects A, B, D, and E were checked in that report. In some embodiments, the properties that were checked and/or the stored/current value of a particular property used in a comparison are recorded in a log or report.

In some embodiments, having records or logs is useful because it demonstrates a regular or consistent process for verifying the validity of stored data for which protection is desired. For example, it would be possible to demonstrate (e.g., to a court) auditing of content or other stored objects over a period of time.

Figure 8A:
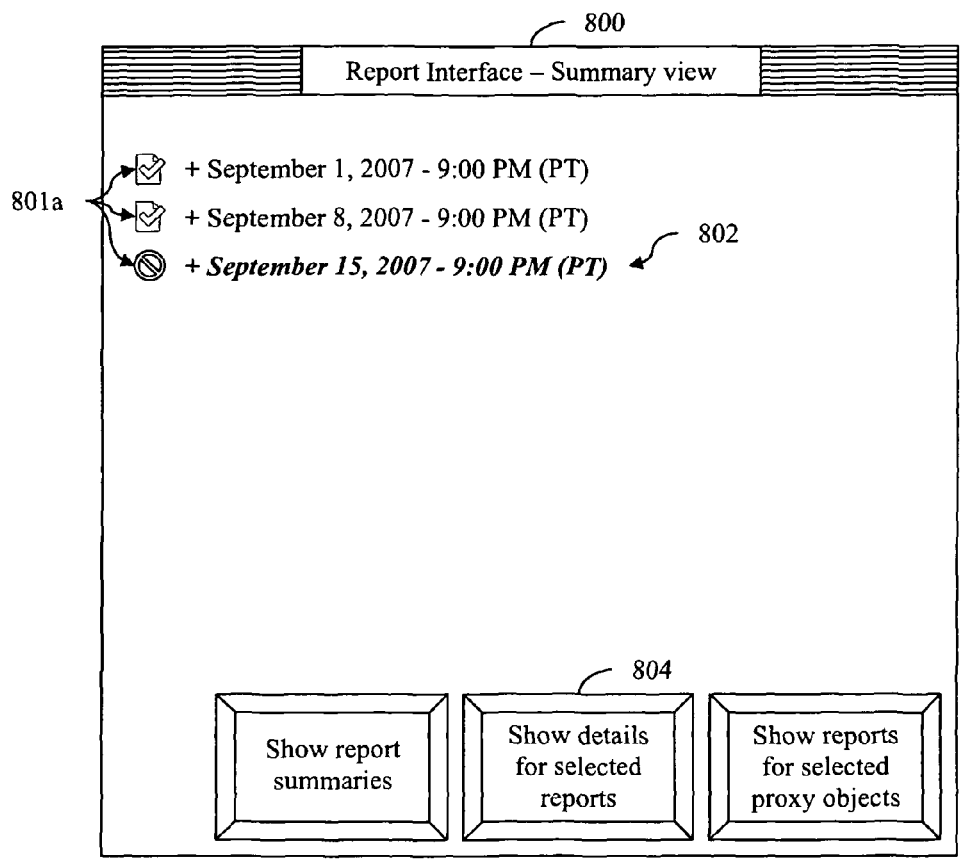
FIG. 8A is a diagram illustrating an embodiment of a user interface in a summary view mode.

FIG. 8A is a diagram illustrating an embodiment of a user interface in a summary view mode. In the example shown, user interface 800 is in a summary view that shows a summary of all exception reports associated with proxy object checking. In this figure and other figures described below, the reports of FIG. 7 are used as an example. The date and time of each report is displayed in user interface 800 with graphical status indicators 801a next to the date and time, indicating the status of a particular report. In this example, a check mark indicates no exceptions associated with a given report and a circle with a diagonal line indicates one or more exceptions. Graphical status indicators 801a are examples and in other embodiments are configured differently. In various embodiments, the state or existence of an exception in a report is indicated using text color (e.g. red for one or more exceptions and green for no exceptions), text style (e.g., bold, italics, underline, etc.), effects (e.g., blinking), etc.

Figure 8B:
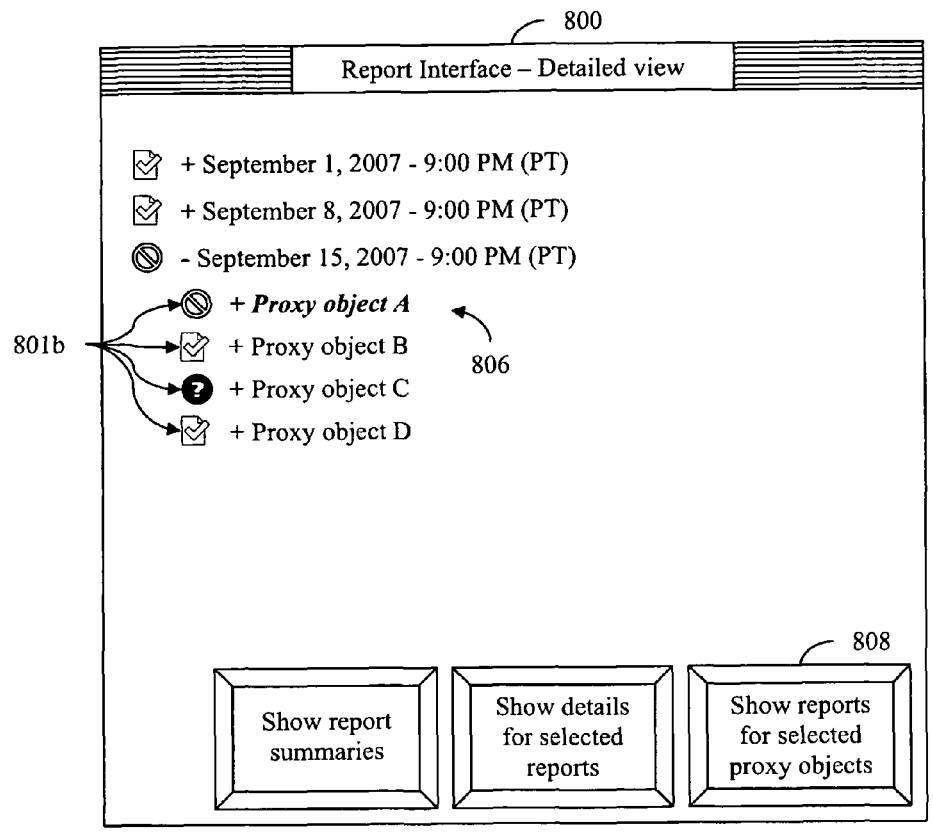
FIG. 8B is a diagram illustrating an embodiment of a user interface in a detailed view mode.

To obtain more details about exceptions in selected report (s), a user in this example selects one or more reports (e.g., report 802) (e.g., using a pointer controlled by a mouse or other stylus) and presses button 804. By pressing button 804, details for the selected report are shown. The mode associated with button 804 is a detailed view mode. FIG. 8B shows user interface 800 in a detailed view mode.

FIG. 8B is a diagram illustrating an embodiment of a user interface in a detailed view mode. In the mode shown, details of selected report(s) (in this case, report 802) are shown. Proxy objects A-D were checked in report 802, but proxy object E was not. Graphical status indicators 801b are located next to each proxy object in report 802 and indicate whether or not there was an exception for a corresponding proxy object. In this example, a checkmark indicates there was no exception, a circle with a diagonal line indicates one or more stored properties for that proxy object did not match the properties of the accessed stored object, and a question mark indicates a stored object could not be found using a location and/or ID stored in the proxy object. Proxy object A has one or more properties that do not match and the stored object associated with proxy object C was not found using the location and/or ID stored in proxy object C. For example, if the stored object is a file, the file may have been deleted, moved, renamed (i.e., a different ID), etc.

To view which reports proxy object A (806) has been checked in, a user selects it and presses button 808. By pressing button 808, reports for selected proxy object(s) is/are shown; this mode is referred to as an object view mode.

Figure 8C:
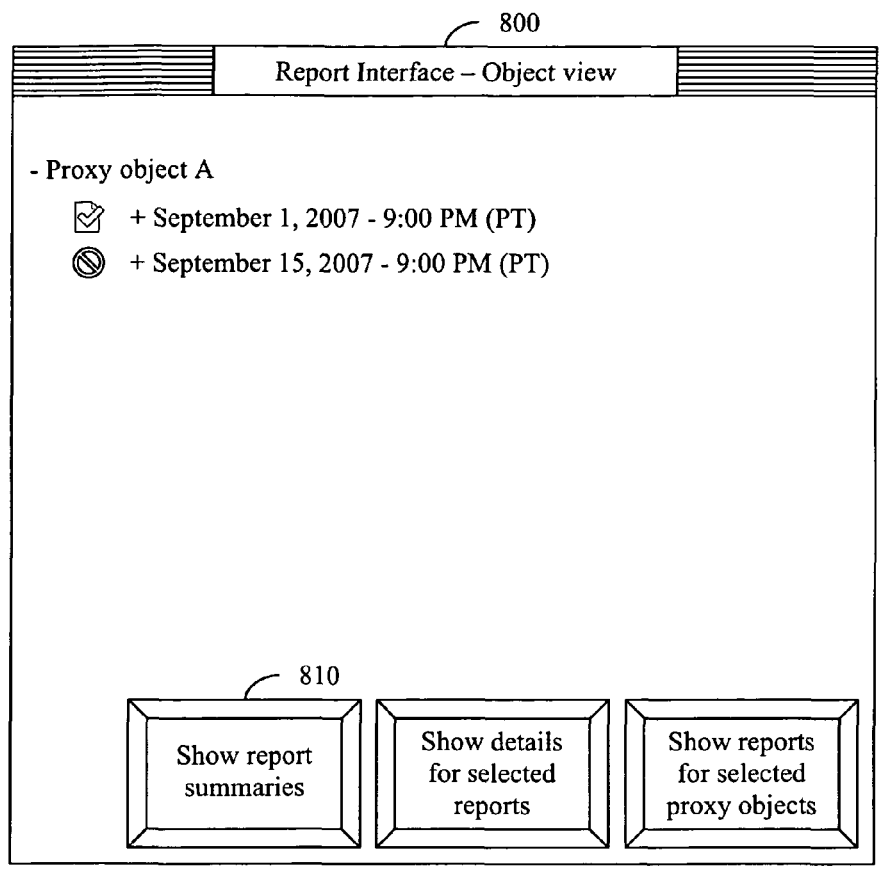
FIG. 8C is a diagram illustrating an embodiment of a user interface in an object view mode.

FIG. 8C is a diagram illustrating an embodiment of a user interface in an object view mode. In the example shown, the reports for a selected proxy object (e.g., proxy object A) are shown. One or more properties associated with proxy object A did not match in the exception report of Sep. 15, 2007 and in an object view it may be more apparent when (e.g., a window of time) the exception occurred. Proxy object A was checked in the report on Sep. 1, 2007 and there was no exception. In the report of Sep. 8, 2007 proxy object A was not checked and is not displayed in the object view mode. In the report of Sep. 15, 2007 proxy object A was checked and an exception was detected. In some embodiments, additional details about the exception are able to be searched, manipulated and/or displayed using user interface 800 (e.g., which property did not match, the value of the stored property and the value of the property obtained from the stored object on the external system, etc.). To return to the summary view mode shown in FIG. 8A, a user presses button 810.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for managing a record, comprising:
generating, at a management system, a proxy object for an object stored at an external system;
selecting, based at least in part on a protection or compliance policy, one or more properties that are derived based at least in part on properties associated with the object, wherein the selected properties permit detection of violations of the protection or compliance policy and comprise a minimum or a smallest set of information that is sufficient to detect violations of the protection or compliance policy;
storing, in the proxy object, the selected one or more properties;
storing, in the proxy object, a location of the object at the external system;
performing an integrity check on the proxy object, including by:
accessing, based at least in part on the location stored in the proxy object, the properties associated with the object at the external system;
comparing, using a processor, the properties associated with the object at the external system with the one or more properties stored in the proxy object;
determining whether the one or more properties stored in the proxy object match the properties associated with the object; and
in the event that the one or more properties stored in the proxy object do not match the properties associated with the object, taking responsive action that includes presenting via a user interface an indication that the object at the external system is compromised; and
wherein the record is included in a plurality of records and the integrity check is performed in connection with an integrity checking process that includes:
selecting from the plurality of records a first subset of records to be processed, wherein any exceptions detected in the first subset of records are written to a first exception log; and
selecting from the plurality of records a second subset of records to be processed, wherein any exceptions detected in the second subset of records are written to a second exception log.

2. The method of claim 1, wherein the one or more stored properties are included in a set of record data configured to represent the stored object in a records management system configured to manage the record.

3. The method of claim 1, wherein the external system is a system other than a records management system on which the record is located.

4. The method of claim 1, wherein the external system is not able to be configured to render the stored object immutable on the external system.

5. The method of claim 1, wherein a first record is associated with a first stored object that is associated with a first application and a second proxy object is associated with a second stored object that is associated with a second application.

6. The method of claim 1, wherein a first record is associated with a first stored object on a first external system and a second record is associated with a second stored object on a second external system.

7. The method of claim 1, wherein the first subset of records and/or the second subset of records includes the plurality of records.

8. The method of claim 1, wherein selecting the second subset of records includes selecting from records that are not selected during selection of the first subset of records.

9. The method of claim 1 further comprising:
obtaining a schedule or frequency associated with processing a plurality of proxy objects;
using the obtained schedule or frequency to determine a first date and/or time at which to process the first subset of records, wherein the first exception log includes the first date and/or time; and
using the obtained schedule or frequency to determine a second date and/or time at which to process the second subset of records, wherein the second exception log includes the second date and/or time.

10. The method of claim 9 further comprising:
displaying at least the first date and/or time with an exception indicator in the event the first exception log contains at least one exception or a no-exception indicator in the event the first exception log contains no exceptions; and
displaying at least the second date and/or time with an exception indicator in the event the second exception log contains at least one exception or a no-exception indicator in the event the second exception log contains no exceptions.

11. The method of claim 10 further comprising:
receiving an indication associated with displaying the first subset of records associated with the first exception log; and
in response to the indication, displaying the first subset of records.

12. The method of claim 11 further comprising:
receiving a second indication associated with displaying exception log(s) in which a selected record from the first subset of records was processed; and
in response to the second indication, displaying information associated with the exception log(s) in which the selected record was processed.

13. The method of claim 1, wherein the one or more stored properties include at least one of the following: a hash of the contents of the stored object, a permission associated with reading, a permission associated with writing or a permission associated with executing.

14. The method of claim 1 further comprising:
receiving an indication to display more information; and
in response to receiving the indication, presenting via the user interface the name of the property for which the content of the object at the external system and the property stored in the proxy object do not match.

15. The method of claim 1 further comprising:
receiving an indication to display more information; and
in response to receiving the indication, presenting via the user interface the content of the object at the external system and the property stored in the proxy object.

16. A system for managing a record, comprising:
a communication interface configured to:
generate, at a management system, a proxy object for an object stored at an external system;
select, based at least in part on a protection or compliance policy, one or more properties that are derived based at least in part on properties associated with the object, wherein the selected properties permit detection of violations of the protection or compliance policy and comprise a minimum or a smallest set of information that is sufficient to detect violations of the protection or compliance policy;
store, in the proxy object, the selected one or more properties;
store, in the proxy object, a location of the object at the external system;
perform an integrity check on the proxy object, including by:
accessing, based at least in part on the location stored in the proxy object, the properties associated with the object at the external system;
comparing, using a processor, the properties associated with the object at the external system with the one or more properties stored in the proxy object;
determining whether the one or more properties stored in the proxy object match the properties associated with the object; and
in the event that the one or more properties stored in the proxy object do not match the properties associated with the object, taking responsive action that includes presenting via a user interface an indication that the object at the external system is compromised; and
wherein the record is included in a plurality of records and the integrity check is performed in connection with an integrity checking process that includes:
selecting from the plurality of records a first subset of records to be processed, wherein any exceptions detected in the first subset of records are written to a first exception log; and
selecting from the plurality of records a second subset of records to be processed, wherein any exceptions detected in the second subset of records are written to a second exception log.

17. The system of claim 16, wherein the one or more stored properties include at least one of the following: a hash of the contents of the stored object, a permission associated with reading, a permission associated with writing or a permission associated with executing.

18. The system of claim 16, wherein the processor is further configured to:
receive an indication to display more information; and
in response to receiving the indication, present via the user interface the name of the property for which the content of the object at the external system and the property stored in the proxy object do not match.

19. The system of claim 16, wherein the processor is further configured to:
receive an indication to display more information; and
in response to receiving the indication, present via the user interface the content of the object at the external system and the property stored in the proxy object.

20. A computer program product for managing a record, the computer program product being embodied in a non-transitory computer readable storage medium and comprising computer instructions for:
generating, at a management system, a proxy object for an object stored at an external system;
selecting, based at least in part on a protection or compliance policy, one or more properties that are derived based at least in part on properties associated with the object, wherein the selected properties permit detection of violations of the protection or compliance policy and comprise a minimum or a smallest set of information that is sufficient to detect violations of the protection or compliance policy;

storing, in the proxy object, the selected one or more properties;

storing, in the proxy object, a location of the object at the external system;

performing an integrity check on the proxy object, including by:

accessing, based at least in part on the location stored in the proxy object, the properties associated with the object at the external system;

comparing, using a processor, the properties associated with the object at the external system with the one or more properties stored in the proxy object;

determining whether the one or more properties stored in the proxy object match the properties associated with the object; and in the event that the one or more properties stored in the proxy object do not match the properties associated with the object, taking responsive action that includes presenting via a user interface an indication that the object at the external system is compromised; and wherein the record is included in a plurality of records and the integrity check is performed in connection with an integrity checking process that includes:

selecting from the plurality of records a first subset of records to be processed, wherein any exceptions detected in the first subset of records are written to a first exception log; and selecting from the plurality of records a second subset of records to be processed, wherein any exceptions detected in the second subset of records are written to a second exception log.

21. The computer program product of claim 20, wherein the one or more stored properties include at least one of the following: a hash of the contents of the stored object, a permission associated with reading, a permission associated with writing or a permission associated with executing.

22. The computer program product of claim 20 further comprising computer instructions for:

receiving an indication to display more information; and in response to receiving the indication, presenting via the user interface the name of the property for which the content of the object at the external system and the property stored in the proxy object do not match.

23. The computer program product of claim 20 further comprising computer instructions for:

receiving an indication to display more information; and in response to receiving the indication, presenting via the user interface the content of the object at the external system and the property stored in the proxy object.

* * * * *